US 6,199,098 B1

(12) United States Patent
Jones et al.

(10) Patent No.: US 6,199,098 B1
(45) Date of Patent: Mar. 6, 2001

(54) METHOD AND APPARATUS FOR PROVIDING AN EXPANDABLE, HIERARCHICAL INDEX IN A HYPERTEXTUAL, CLIENT-SERVER ENVIRONMENT

(75) Inventors: Kirsten Lynn Jones; Katherine Ellis Weber, both of San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 08/606,364

(22) Filed: Feb. 23, 1996

(51) Int. Cl.$^7$ .................................................. G06F 15/163
(52) U.S. Cl. ..................... 709/203; 709/310; 707/501; 707/513; 707/514
(58) Field of Search ........................... 395/200.01, 776; 707/501, 513, 514; 709/203, 310

(56) References Cited

U.S. PATENT DOCUMENTS 5,495,607 * 2/1996 Pisello et al. ........................... 707/10
5,572,643 * 11/1996 Judson ................................. 709/218
5,625,781 * 4/1997 Cline et al. ............................ 345/335

OTHER PUBLICATIONS

Berners–Lee, Tim, et al., "The World–Wide Web," Communications of the ACM, Aug. 1994, vol. 37, No. 8.
Putz, Steve, "Interactive Information Services Using World–Wide Web Hypertext," Computer Networks and ISDN Systems, Nov. 1994, vol. 27, No. 2.
Perrochon, Louis, "Translation Servers: Gateways Between Stateless and Stateful Information Systems," Institut fur Informationssysteme, Eth Zurich.

(List continued on next page.)

Primary Examiner—William M. Treat
(74) Attorney, Agent, or Firm—Staas & Halsey LLP

(57) ABSTRACT

A method and apparatus are provided for navigating through electronically stored information using an expandable, hierarchical index or TOC, in a hypertextual client-server network environment such as the World Wide Web. The client-server network comprises at least one client computer coupled by network link to at least one server computer. In accordance with the invention, a publisher of the TOC provides to the server a digital specification of the TOC, defining the TOC as a plurality of hierarchically related nodes. In a preferred feature of the invention, the digital specification includes a unique name, a display label, and a hierarchial level for each node of the TOC, and an optional target URL for each leaf node of the TOC. Using a browser program or the like at the client computer, an end-user transmits a network request including an address path to the server. Upon receiving the network request, and based upon the address path and the digital specification, the server dynamically generates a network page specifying display of a hierarchical portion of the TOC entries. This network page is transmitted from the server to the client, for display to the end-user. In another feature of the present invention, when the server dynamically generates the network page, it assignes a path address as a hypertextual link for one or more of the TOC nodes in the hierarchical portion of the TOC to be displayed. The path address specifies a modified display status for the TOC entries that are hierarchical descendants of the at least one TOC entry. In this way, the present invention can preferably be used to provide an interactively expandable TOC in a client-server environment. When an end-user, utilizing a browser of the client, interactively selects one of the currently displayed TOC nodes, the assigned hypetextual link will automatically be transmitted to the server as part of a new network request, and will cause the server to dynamically generate a new network page specifying a modified display status for TOC nodes that are hierarchical descendants of the selected node, thus effectively expanding or contracting the TOC hierarchy beneath the selected node. In this way, the TOC hierarchy can interactively be expanded or contracted in an incremental fashion, with the current display state of the TOC being represented in portions of each hypertext path address.

11 Claims, 8 Drawing Sheets

OTHER PUBLICATIONS

Wolf, Gary, "Steve Jobs: The Next Insanely Great Thing," *Wired Magazine*, Feb. 1996.

Sarah Baker, "Mosaic–surfing at Home and Abroad", *Proceedings of the 22nd ACM SIG UCCS Conference on User Services*, pp. 159–163, 1994.*

Mukherjea et al., "Visualizing the World–Wide Web with the Navigational View Builder," Technical Report GIT–GVU–95–09, Graphics, Visualization and Usability Center, College of Computing, Georgia Institute of Technology, Mar. 1995, 14 pages.*

Mukherjea et al., "Visualizing Complex Hypermedia Networks through Multiple Hierarchical Views", Technical Report GIT–GVU–95–08, Graphic, Visualization and Usability Center, College of Computing, Georgia Institute of Technology, Mar. 1995, 7 pages.*

Ayers et al., "Using Graphic HIstory in Browsing the World Wide Web", Technical Report GIT–GVU–95–12, Graphics, Visualization and Usability Center, College of Computing, Georgia Institute of Technology, May 1995, pp. 1–14.*

Jakob, Nielsen, "The Art of Navigating Through Hypertext", *Communications of the ACM*, vol. 33, No. 3, Mar. 1990, pp. 297–310.*

Frank G. Halasz, "Reflections on Notecards: Seven Issues for the Next Generation of Hypermedia Systems", *Communications of the ACM*, vol. 31, No. 7, Jul. 1988, pp. 836–852.*

Gershon et al., "Case Study. Visualizing Internet Resources", *Proceedings. Information Visualization*, IEEE, Oct. 30–31, 1995, pp. 122–128, 151.*

Eick et al., "Visualizing the Internet: Putting the User in the Driver's Seat", *Proceedings: Visualization '95*, IEEE, Oct. 29–Nov. 3, 1995, pp. 416–421.*

Mitchell et al., "Case Study: Fishing for Information on the Internet", *Proceedings. Information Visualization*, IEEE, Oct. 30–31, 1995, pp. 105–111, 149.*

Hendley et al., "Case Study. Narcissus: Visualizing Information", *Proceedings. Information Visualization*, IEEE, Oct. 30–31, 1995, pp. 90–96, 146.*

K. Andrews, "Case Study. Visualizing Cyberspace: Information Visualization in the Harmony Internet Browser", *Proceedings. Information Visualization*, IEEE, Oct. 30–31, 1995, pp. 97–104, 147–148.*

* cited by examiner

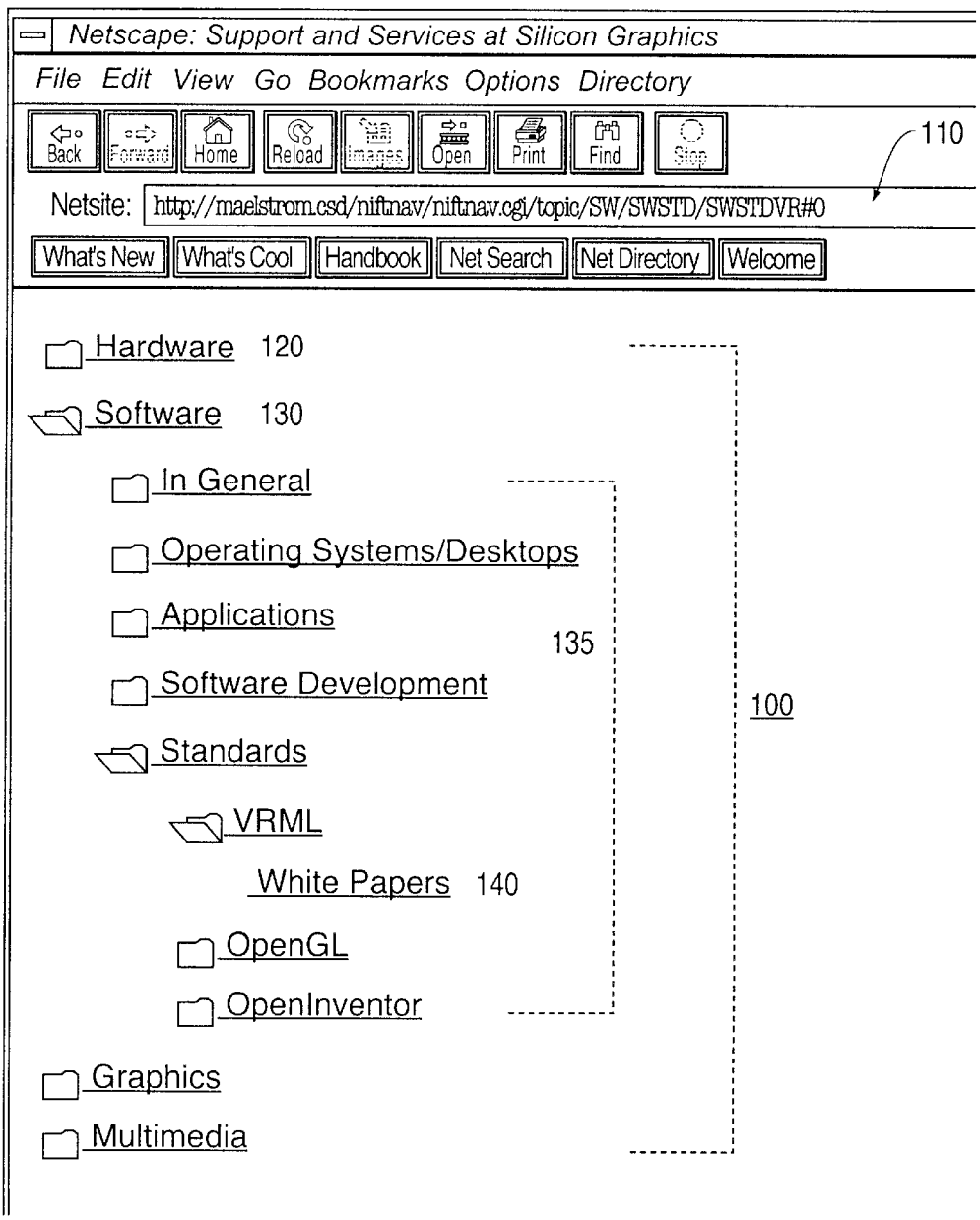

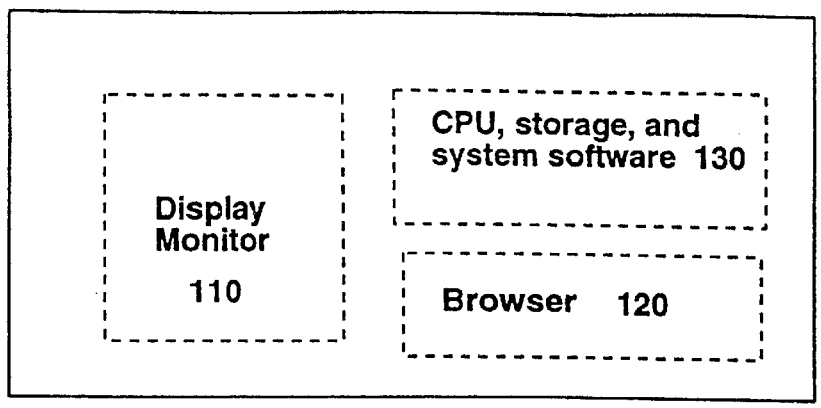
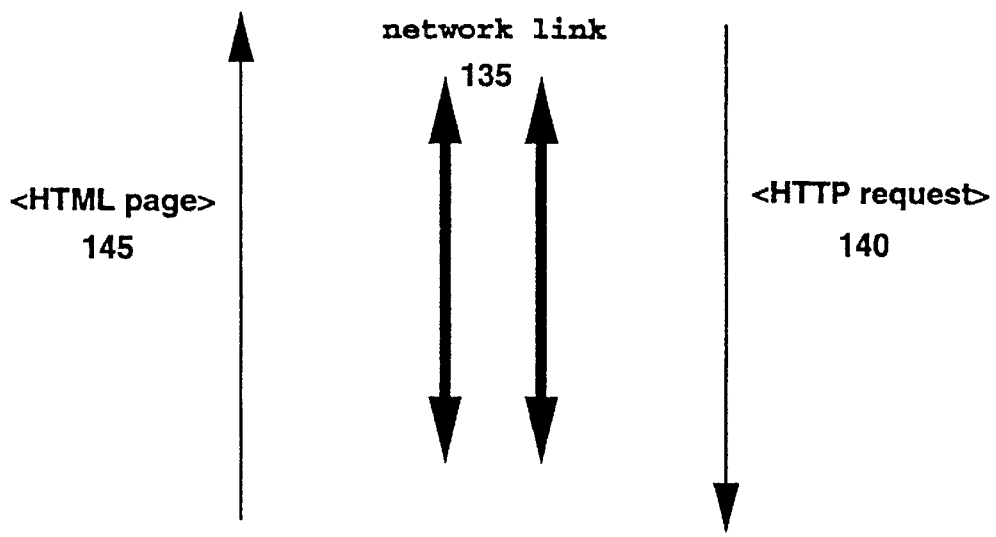
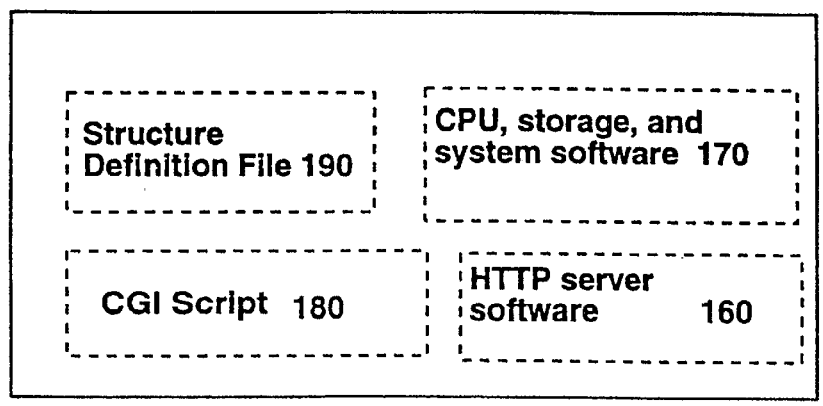
FIG. 2

METHOD AND APPARATUS FOR PROVIDING AN EXPANDABLE, HIERARCHICAL INDEX IN A HYPERTEXTUAL, CLIENT-SERVER ENVIRONMENT

FIELD OF THE INVENTION

The present invention relates to computer technology for navigating through electronically stored information using a hierarchical index or table of contents, in a hypertextual client-server network environment such as the World Wide Web.

BACKGROUND

Navigation is one of the primary interface challenges for information providers. If an information structure is not easy to navigate, the user may become frustrated and move on without finding the desired data. There are at least two major paradigms for navigating through on-line information. The first, keyword searching, is relatively easy to support in a typical client-server environment, such as the World Wide Web. The other, hierarchical index browsing, is far more challenging to implement satisfactorily in a client-server network environment like the World Wide Web.

By hierarchical index browsing, we refer to providing interactive access to information through a hierarchical, tree-like, incrementally expandable table-of-contents ("TOC"). The expandable TOC is displayed to users on a computer screen, and as each node within the TOC is interactively selected or activated by a user, the next level of information for that node is shown indented, directly below its "parent" node. Selected portions of the TOC hierarchy are thus expanded while maintaining the context of the rest of the tree. In this way, users can explore selected portions of the TOC in greater detail, while maintaining the larger context of the overall structure. Ultimately, interactive selection by the user of a leaf node at the lowest level of hierarchy within the TOC will typically cause an associated document or set of information to be displayed for the user. The navigational paradigm of hierarchical index browsing has been commonly used in a wide variety of personal computer applications, but until now has not been successfully realized in a client-server network environment like the World Wide Web, as will be explained below.

The World Wide Web ("the Web") is a voluminous collection of hypertextually linked documents and information distributed across wide-area networks. The Web effectively unites a diverse body of heterogeneous computers, allowing the computers to exchange information using a standardized document language known as HTML (the "HyperText Mark-up Language"). Each computer that is part of the Web can access an HTML document located elsewhere within the Web basically in the following manner: the computer seeking access runs a standard "browser" program, which formulates a request encoded in HTTP (the "Hypertext Transfer Protocol") for accessing a desired network document, and transmits that request across a network to the computer on which the document is stored. At the heart of the HTTP request is a URL (or "Uniform Resource Locator"), which is essentially an address path identifying the computer which hosts the desired document, and also identifying the document to that host computer. The host computer receives and parses the HTTP request, and responds by transmitting a copy of the document to the requesting computer. Assuming the document is written in standard HTML, the recipient computer's browser will cause the document to be displayed appropriately on the recipient computer, even though the recipient and host computers may in fact represent heterogeneous computer platforms. In traditional client-server terminology, the computer running the browser program and issuing the request is the "client," while the computer hosting the document and servicing the request for access is the "server." For more information about the Web, see for example T. Berners-Lee, R. Cailliau, A. Loutonen, H. F. Nielsen, and A. Secret, "The World Wide Web," *Communications of the ACM*, vol. 37(8), August 1994.

On the Web, effective navigational tools are of critical importance and value. However, until now, there has been no satisfactory implementation of hierarchical index browsing for computer environments like the Web. Broadly speaking, that is because supporting an incrementally expandable, tree-like TOC requires some mechanism to capture and keep track of the current state of the TOC (i.e., which nodes are currently expanded and which are not). However, uniform protocols like HTTP and HTML are generally stateless; indeed, they are intentionally simplistic, in order to better unify a diverse body of heterogeneous computers. Therefore, the conventional wisdom has been that the limited, stateless environment of HTML and HTTP are not suitable for implementing more sophisticated navigational facilities such as true hierarchical index browsing.

Several navigational facilities have been developed in a compromise effort to capture at least some of the benefits of hierarchical index browsing. One common approach is the "limited context" solution, which works as follows. When a node within the hierarchical TOC is selected or activated, a new page is displayed, containing only the information pertaining to that selected node. The node path information is often displayed at the top of the page, in an effort to maintain some contextual information for the current node. Nonetheless, this solution ultimately causes a context shift for the user, forcing the user into a restricted view of the overall TOC by removing relationships to other nodes at higher levels. This solution also requires separate pages to be maintained for each node and sub-node on the server. In another prior art solution, the "single-open" solution, users are allowed to expand a single, selected node, while otherwise maintaining the original TOC structure in the display. However, when a second node at the same level is selected, the first node collapses. This unexpected behavior causes undesirable confusion, since there is no user-intuitive reason for imposing a limitation on the number of open nodes. Rather, the "single open" imitation is caused by the underlying implementation. One static page specifying the display of an expanded node is created for each node in the table of contents, and an appropriate one of those pages must be selected in response to the user's interactive selection of TOC nodes. Thus, in order to support multiple open nodes using this prior art approach, the number of predefined static pages required would increase logarithmically, which would be unwieldy and impractical for even relatively simple TOC hierarchies.

Client-server browsers that support more complex programming languages like Java (from Sun Microsystems) may eventually allow information providers to offer their users full-featured user interfaces comparable to those now available in personal computer environments. However, unless and until a language like Java becomes standard for all browsers, networked communities like the Web must work within the limitations of existing, stateless browsers, or else forfeit the benefit of universal information access within their community. Indeed, some visionaries in the field have argued forcefully against efforts to replace current browsers with more complicated and powerful programming languages, on the grounds that universal compatibility for information exchange should not be compromised. According to this view, the simplicity of current browsers is at the same time their greatest strength.

What is needed is a methodology that provides true hierarchical index browsing of hypertextual client-server documents, without abandoning the simplicity of current browsers and markup languages. Stated differently, what is needed is a practical implementation of hierarchical index browsing in a current client-server environment like the Web, such that hierarchical TOC context is fully maintained at all levels for the user, without requiring adjustments to standard network browsers and without adding unexpected, unwanted behaviors.

SUMMARY OF THE INVENTION

The present invention provides a method and apparatus for navigating through electronically stored information using an expandable, hierarchical index or TOC, in a hypertextual client-server network environment such as the World Wide Web. The client-server network comprises at least one client computer coupled by network link to at least one server computer. In accordance with the invention, a publisher of the TOC provides to the server a digital specification of the TOC, defining the TOC as a plurality of hierarchically related nodes. In a preferred feature of the invention, the digital specification includes a unique name, a display label, and a hierarchial level for each node of the TOC, and an optional target URL for each leaf node of the TOC. Using a browser program or the like at the client computer, an end-user transmits a network request including an address path to the server. Upon receiving the network request, and based upon the address path and the digital specification, the server dynamically generates a network page specifying display of a hierarchical portion of the TOC entries. This network page is transmitted from the server to the client, for display to the end-user.

In another feature of the present invention, when the server dynamically generates the network page, it assignes a path address as a hypertextual link for one or more of the TOC nodes in the hierarchical portion of the TOC to be displayed. The path address specifies a modified display status for the TOC entries that are hierarchical descendants of the at least one TOC entry. In this way, the present invention can preferably be used to provide an interactively expandable TOC in a client-server environment. When an end-user, utilizing a browser of the client, interactively selects one of the currently displayed TOC nodes, the assigned hypertextual link will automatically be transmitted to the server as part of a new network request, and will cause the server to dynamically generate a new network page specifying a modified display status for TOC nodes that are hierarchical descendants of the selected node. In this way, the TOC hierarchy can interactively be expanded or contracted in an incremental fashion, with the current display state of the TOC being represented in portions of each hypertext path address.

BRIEF DESCRIPTION OF THE DRAWINGS

FIG. 1E illustrates the display of an expandable TOC, with a display state in which an open node is expanded several levels deeper.

FIG. 2 is a high level architectural view of a preferred embodiment for the present invention.

DETAILED DESCRIPTION OF THE INVENTION

A. Definitional Note

Herein we use the term "table of contents" (or "TOC") in its broadest, most inclusive sense. Of course one example of a TOC is a traditional table of contents for a book or reference document, which might be structured in chapters, subchapters, and sections, etc. But equally included in the term "table of contents" or "TOC" for our purposes is any hierarchically structured table or index describing the contents of any document or collection of information.

B. End-User Perspective

A preferred embodiment of the present invention supports implementing an incrementally expandable table of contents ("TOC") in a client-server network environment like the Web. We begin our description with an illustration of what this advantageous capability looks like from the perspective of an end-user.

Figure 1A:
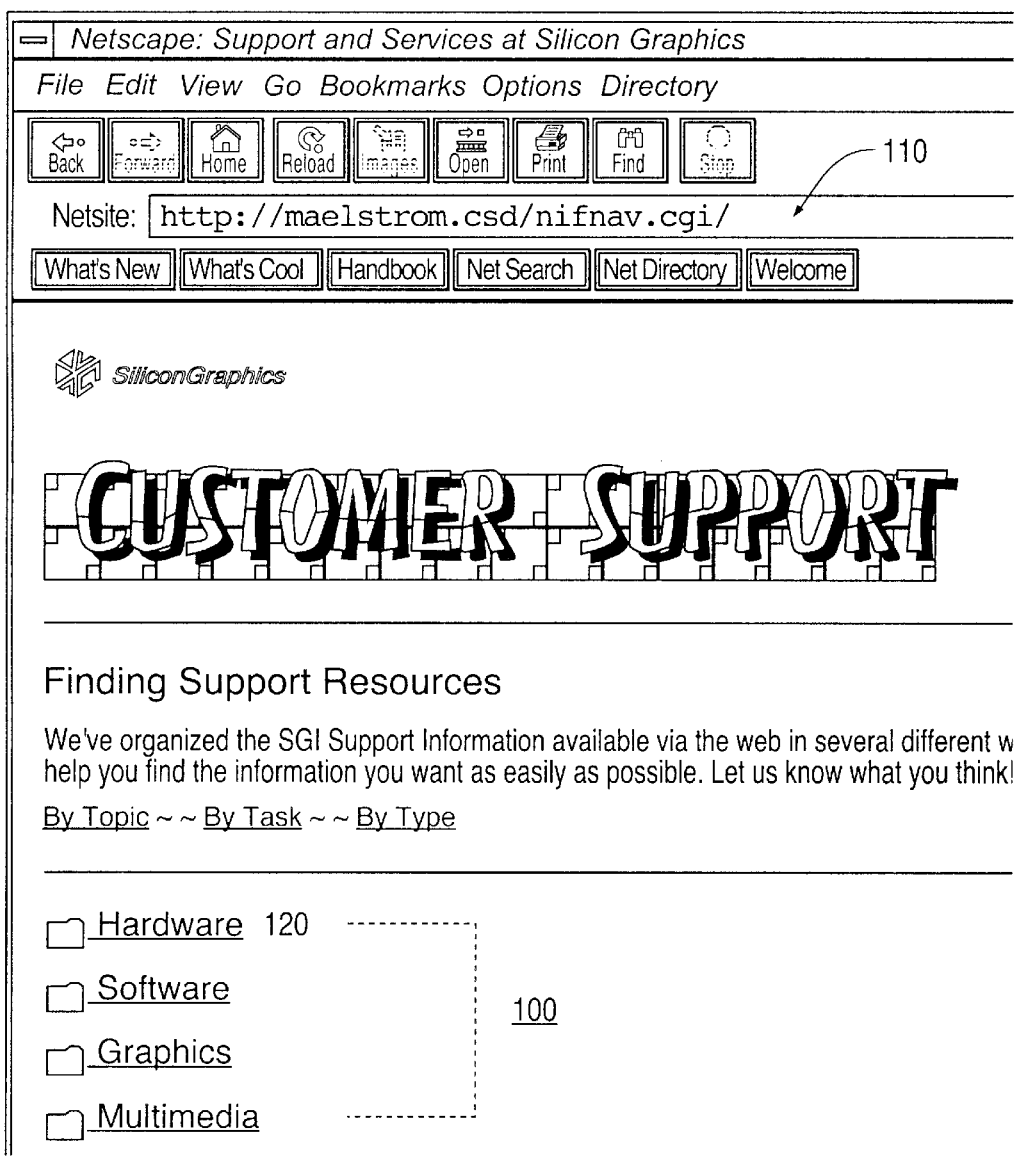
FIG. 1A illustrates the display of an expandable TOC, with a display state in which all top-level nodes of the TOC are closed.

FIG. 1A illustrates the display contents of a typical end-user computer screen, wherein a standard Web browser (such as Netscape's Navigator product, or the XMosaic browser available from NCSA and Spyglass) has been used to access a Web site configured in accordance with a preferred embodiment of the present invention. In this example, the Web site is located at a network address defined by the URL "http://maelstrom.csd/niftnav/niftnav.cgi/", shown in URL window 110. In other words, as those of ordinary skill in the art will readily recognize, the site is located at a network server machine identified as maelstrom.csd, while the remainder of the URL provides an address path that the "maelstrom.csd" server uses to identify the site. The display of FIG. 1A includes TOC 100, a table of contents for an on-line Customer Support library. Currently shown is the top hierarchical level for that TOC.

Figure 1B:
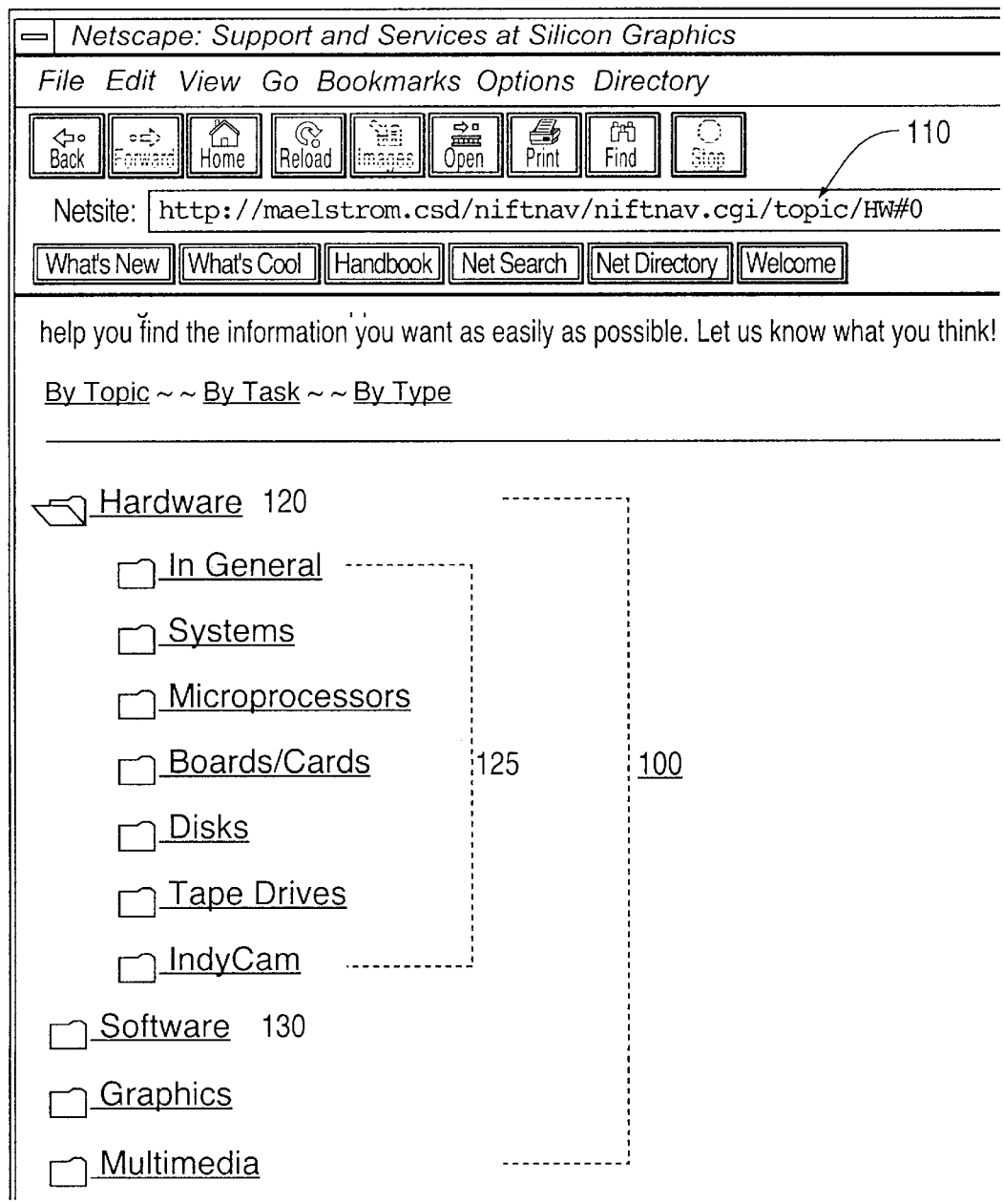
FIG. 1B illustrates the display of an expandable TOC, with a display state in which one of the top-level nodes of the TOC has been opened.

TOC 100 is, in accordance with the present invention, expandable at the end-user's request. For example if the end-user uses a cursor control device or the like to "select" "Hardware" entry 120, then the end-user's browser will automatically formulate an HTTP request using the hypertext link that is internally assigned to "Hardware" entry 120 by the HTML code for the Web page being displayed, as those of ordinary skill in the art well know. In accordance with the present invention, the response will be transmitted to the end-user's browser as a new Web page specifying a display as shown in FIG. 1B. As shown in that figure, Hardware entry 120 has now been "opened" in the display, revealing the level of hierarchy directly below Hardware entry 120 in the table of contents (i.e., the hierarchical "children" 125 of Hardware entry 120). We refer to this modified, expanded display of the TOC as another display "state" for the TOC. In general, a display "state" of the TOC specifies which entries (or "nodes") within the TOC hierarchy are "open" and reveal their children, and which nodes are "closed" and conceal their children. In the display state of FIG. 1B, Hardware node 120 is open, while the other TOC nodes are all closed.

Figure 1C:
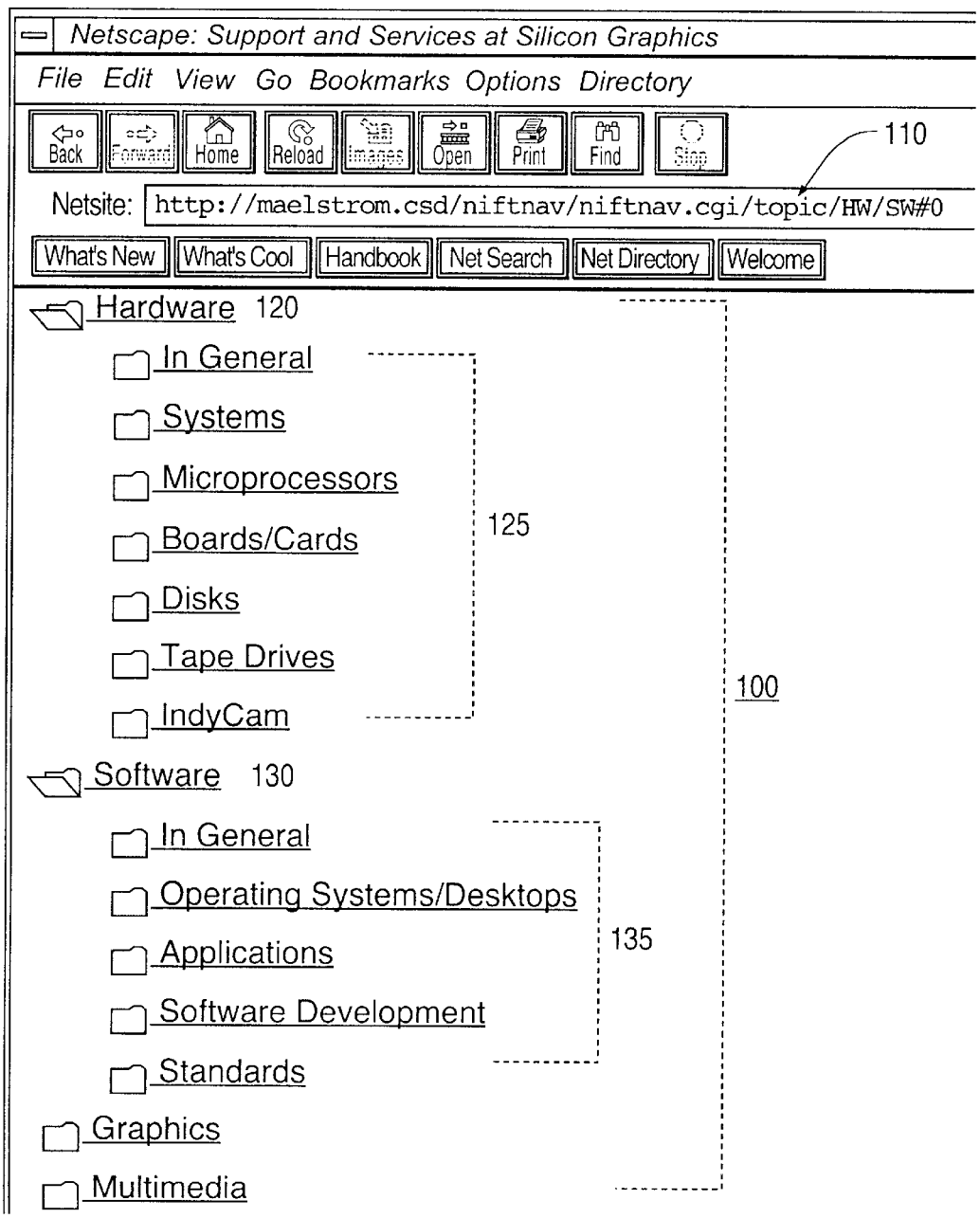
FIG. 1C illustrates the display of an expandable TOC, with a display state in which another one of the top-level nodes of the TOC has been opened.
Figure 1D:
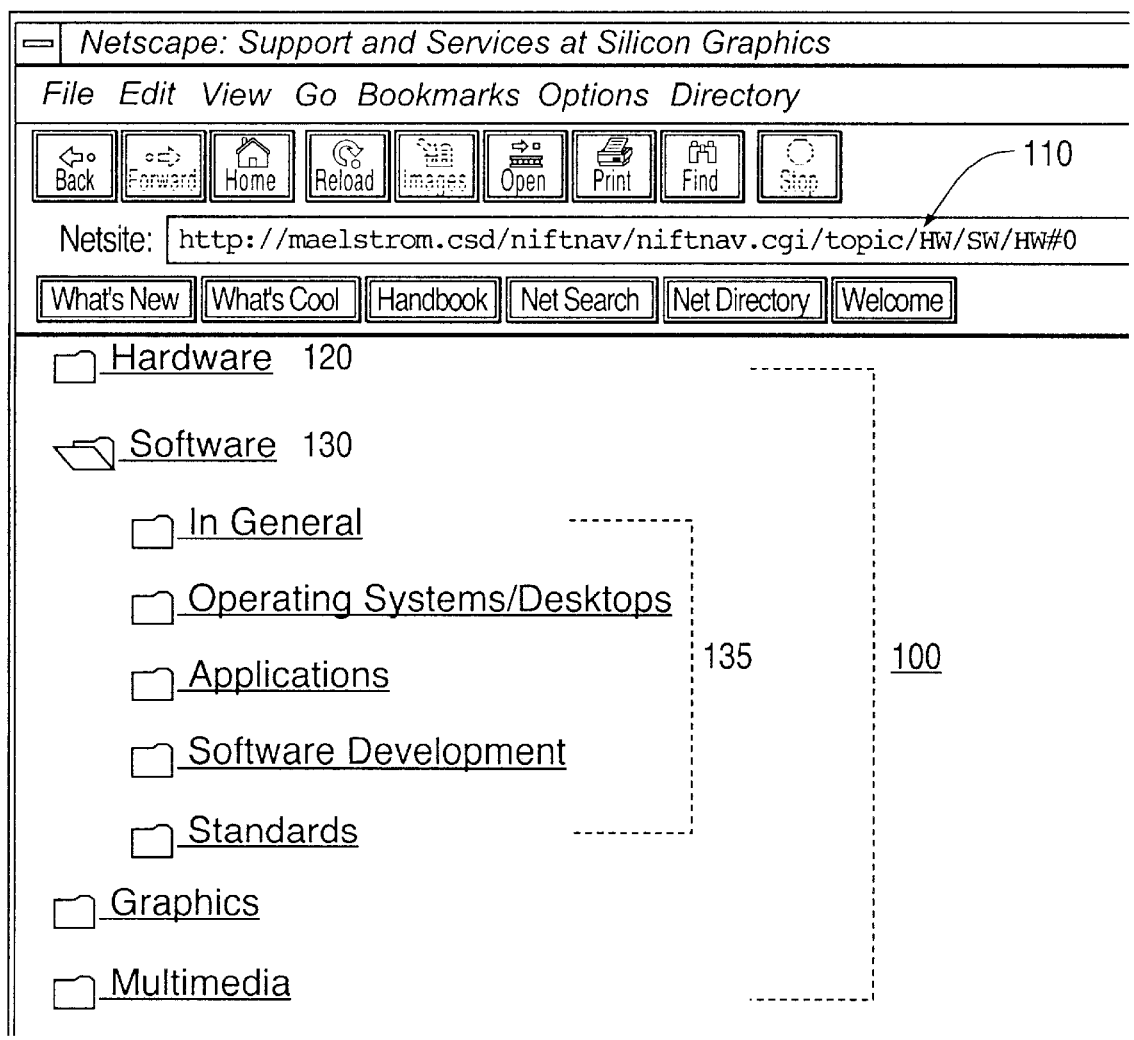
FIG. 1D illustrates the display of an expandable TOC, with a display state in which the first one of the top-level nodes to be opened has now been closed, while the second one remains open.

The end-user can continue to incrementally expand and/or contract the hierarchical display of the table of contents. Thus FIG. 1c illustrates what the end-user sees if he or she "selects" Software entry 130 from the display of FIG. 1B. In the Web page shown in FIG. 1C, the display state of the TOC is similar to that shown in FIG. 1B, except it has been modified so as to open Software node 130, revealing and displaying that node's hierarchical children 135. The display state of FIG. 1C is otherwise the same as for FIG. 1B, e.g., Hardware node 120 remains open. Next, FIG. 1D shows that if the end-user selects Hardware entry 120 from the display of FIG. 1C, then the display state is again incrementally modified, this time "closing" Hardware node 120 and concealing children 125 while Software node 130 remains open. FIG. 1E reflects expansion by the end-user of Software node 130 down through several levels of hierarchy, ultimately revealing leaf node 140 labeled "White Papers" which provides a direct hypertextual link to relevant information located elsewhere on the Web. The TOC display state of FIG. 1E is otherwise unchanged. This incremental expansion and contraction of a hierarchical TOC's display state is in marked contrast to prior art efforts in this area, as discussed above in the Background section.

C. Overview of Architecture and Methodology

FIG. 2 provides a high level architectural view of a preferred embodiment for implementing the present invention. End-user utilizes client computer 100, and standard browser program 120 executing thereon, to request, retrieve, and display network documents, e.g.,Web pages. Each request by client computer 100 for retrieval of a network document is formulated in accordance with the network protocol, e.g., HTTP, and transmitted by browser 120 across network communications link 135 to server computer 150. Server computer 150 receives HTTP requests such as request 140 and processes them using HTTP server software 160, e.g., standard network server software. In addition, in accordance with the present invention, server computer 150 uses script program 180 to process requests involving an expandable table of contents. Script program 180 in turn references structure definition file 190, which defines the overall hierarchical structure of a given TOC; script 180 also references portions of the address path making up HTTP request 140, to extract information about the current display state of the TOC. Utilizing structure definition file 190 and portions of HTTP request 140, script program 180 dynamically generates HTML Web page 145 specifying a hierarchical TOC display reflecting the currently desired display state. Script program 180 can then cause server software 160 to transmit a copy of Web page 145 back to client computer 100 and browser program 120, for display on monitor 110.

Figure 3:
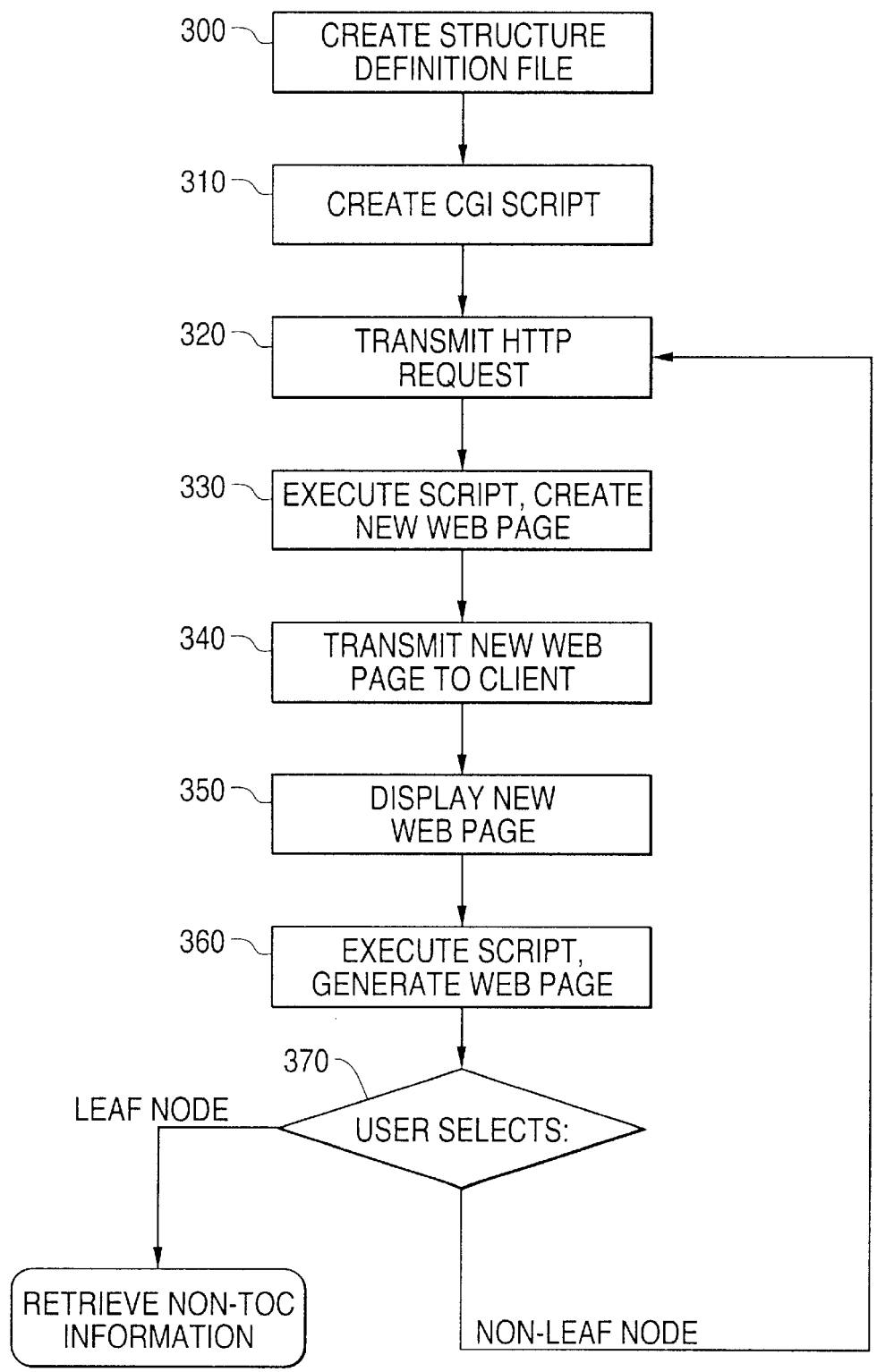
FIG. 3 is a flow diagram of the major tasks performed in a preferred embodiment for the present invention.

FIG. 3 is a flow diagram of the major tasks performed in a preferred embodiment for the present invention. At step 300, the user who wishes to publish a TOC for navigating on-line information creates structure definition file 190, thereby specifying a hierarchical structure for the TOC. The details of structure definition file 190 are described herein in a later section. At step 310, the publisher user prepares script program 180 (preferably a CGI script) for dynamically generating Web pages representing the expanding or contracting TOC, as discussed in detail below. At step 320, the end-user of client computer 100 uses standard HTML browser 120 to formulate HTTP request 140 and transmit that request to server computer 150. HTTP request 140 includes a URL addressing script program 180, plus (optionally) additional fields which encode a current hierarchical display state as described below. These additional fields are preferably stored by server 150 in the "PATH_INFO" variable, and so we sometimes refer herein to this information as "PATH_INFO" information.

Responsive to step 320, at step 330 script 180 is run by server 150. The script dynamically generates new web page 145 specifying display of the TOC. As explained in much greater detail below, the script examines structure definition file 190 along with the PATH_INFO information from HTTP request 140 in order to determine which TOC nodes should be displayed. TOC nodes to be displayed are included by script 180 as entries in the new web page. For example, the top level nodes in the TOC, as identified in the structure definition file, are always displayed; traversing through the TOC hierarchy, each node's children are displayed if and only if the node is in "open" state. As explained below, the PATH_INFO information encodes the "open" or "closed" state of each node; for example, each non-leaf node is closed, unless the name of that node appears once in PATH_INFO in which case that node is opened. At step 340, server 150 passes new web page 145 to client browser 120, and at step 350 browser 120 causes display of the new web page for the end-user on monitor 110.

Note that in order to allow incremental expansion of the TOC hierarchy by the client user in an interactive fashion, at step 330 script 180 encodes each non-leaf node in the new web page with a hypertext link that encodes the current display state of the TOC but with the "open/closed" status of the linked node toggled (i.e., reversed). In other words, the display state is encoded such that if the client browser selects a non-leaf node within the TOC, the effect will be to transmit a URL to the server as HTTP request 140 that effectively requests a toggling of that node's current open/closed state, without affecting the open/closed state of any other nodes in the TOC. (Leaf nodes are always just hypertextually linked to their destination path.) Thus, FIG. 3 indicates that at decision point 370, if the end-user interactively selects a non-leaf node of the TOC, the flow of control returns to step 320, wherein the URL transmitted by the browser will be the URL assigned as a hypertext link to the selected non-leaf node, subsequently causing a toggling of that node's open/closed display state. This process is repeatable and may be iterated so as to incrementally expand and contract the TOC display for as long as the end-user desires. If instead the end-user clicks on a leaf node at decision point 370, then the network information hypertextually linked to that leaf node is retrieved and displayed.

D. The Structure Definition File

Structure definition file 190 preferably is simple and intuitive to use, yet is sufficiently extensible to represent a hierarchical TOC with no limit on depth or number of nodes. In our preferred embodiment of the present invention, structure definition file 190 includes the following fields for each node of the TOC hierarchy:

LEVEL|NAME|LABEL|(optional) URL

The LEVEL field indicates how many levels deep the node is nested within the TOC hierarchy; e.g., top level nodes receive a "1" in their LEVEL field. The NAME field provides a unique internal identifier for the node. The NAME field is also used to encode the hierarchical relationships between nodes; thus, the child of a parent node preferably has a NAME that begins with the parent node's NAME. The LABEL field for each node contains the text label that should be displayed for this node on any web page that is subsequently created. The optional "URL" field is generally appropriate only for "leaf" nodes of the TOC hierarchy, and when included it specifies a URL for linking to a Web page or network information source.

The structure definition file should be ordered in a manner reflecting depth-first traversal of the TOC hierarchy, such that none of a node's hierarchical descendants appear in the file before the node itself. A simple, example structure definition file could look like this:

1|ST|"Starting Node"|
   2|STCH|"First Child Node"|
   3|STCHCH|"Next Generation Node"|http://foo.com
   2|STCHI|"Second Child Node"|http://bar.com This tree layout describes the author's intent as follows: When the tree is initially displayed, only "Starting Node" should be visible (it is the only Level 1 node in the tree). If that node is activated, "First Child Node" and "Second Child Node" should be revealed; both of those nodes are Level 2 nodes whose names begin with the name given to "Starting Node." "First Child Node" can be activated to reveal "Next Generation Node." Both "Next Generation Node" and "Second Child Node" are leaf nodes in the TOC hierarchy, and are assigned URL's that directly link to web pages external to the TOC structure.

As a somewhat more complicated example, here is the listing for a structure definition file suitable for generating the TOC illustrations of FIGS. 1(A) through 1(E):

1|HW|"Hardware"|
   2|HWGEN|"In General"|
   2|HWSYS|"Systems"|
   2|HWCHP|"Microprocessors"|
   2|HWBRD|"Boards/Cards"|
   2|HWDSK|"Disks"|
   2|HWTAP|"Tape Drives"|
   2|HWCAM|"IndyCam"|
   1|SW|"Software"|
   2|SWGEN|"In General"|
   2|SWOS|"Operating Systems/Desktops"|
   2|SWAPPS|"Applications"|
   2|SWLANG|"Software Development"|
   2|SWSTD|"Standards"|
   3|SWSTDVR|"VRML"|
   4|SWSTDVRPAP|"White Papers"|/Technology/whitepapers.html#VRML
   3|SWSTDGL|"OpenGL"|
   3|SWSTDINV|"OpenInventor"|
   1|GFX|"Graphics"|
   1|MM|"Multimedia"|

E. The Script Program

Figure 4:
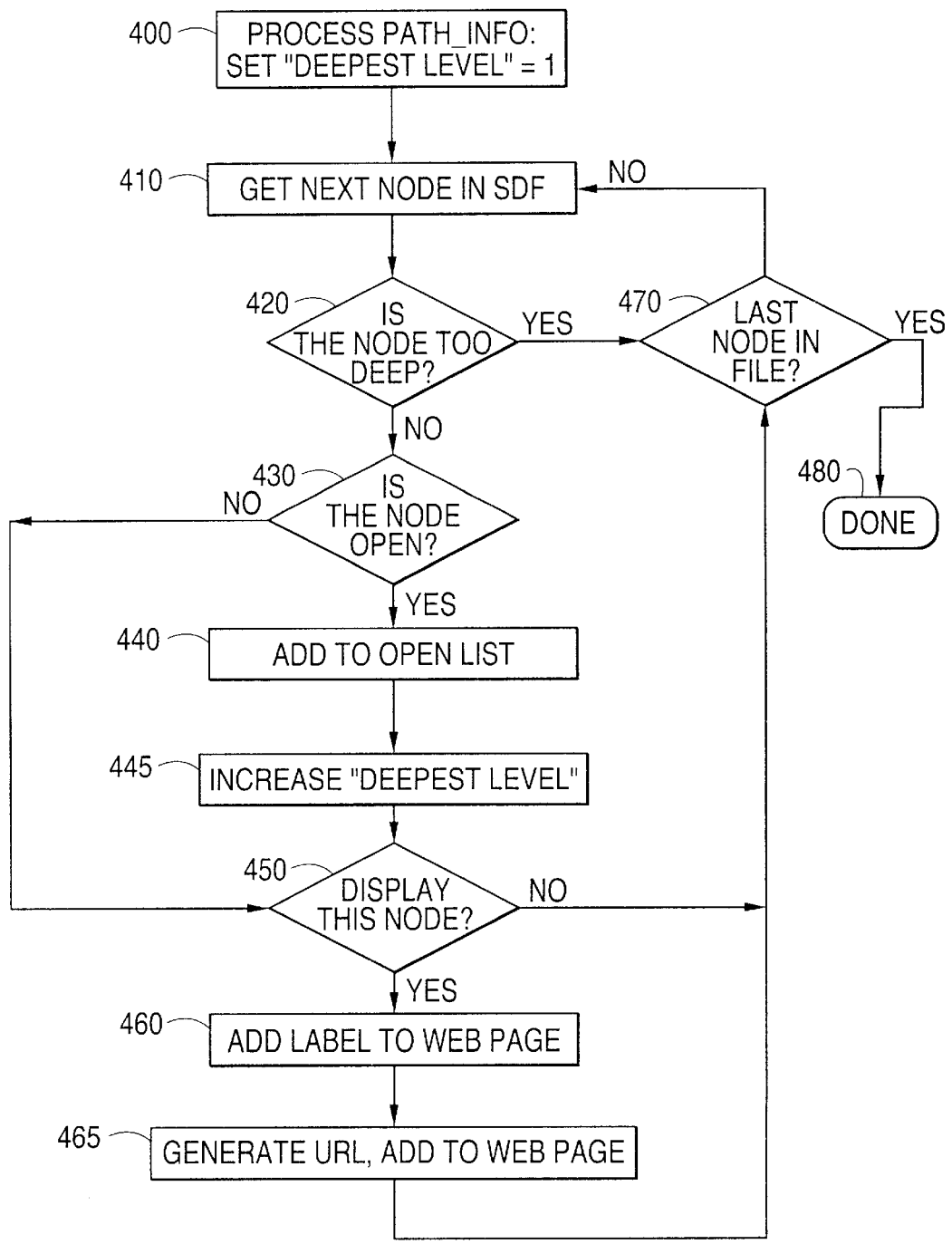
FIG. 4 is a flow diagram of a preferred algorithm for dynamically generating Web pages for an expandable hierarchical TOC, in accordance with the present invention.

Recall that in step 330 of FIG. 3, Script program 180 parses structure definition file 190, and dynamically creates HTML pages that match the user's expectations, based on display state information as encoded in HTTP request 140. FIG. 4 diagrams a preferred algorithm for performing this task.

The preferred algorithm begins at step 400, by initializing some storage variables for subsequent use. In particular, script 180 stores in an array all PATH_INFO names (i.e., any fields in the URL beyond the path address for script 180), if any, that were passed by the client in HTTP request 140. The script checks this array for any duplicates; upon finding a duplicate, the script executes a "closing" routine, which removes both copies of the name from the array as well the names of any descendant nodes from the array. This effectively closes the node selected and removes any display state information for nodes below it. In addition, in the interests of efficiency, during initial step 400 a storage variable is preferably allocated and initialized to 1. This variable keeps track of the deepest level in the TOC hierarchy that is potentially displayable, as the structure definition file is being processed. As described below, each time an "open" node is encountered, the variable is increased (if necessary) to match the level of the open node's children (i.e., the level of the open node itself, plus one).

Beginning at step 410, script 180 processes each node in structure definition file 190, one by one. Decision point 420 tests whether the current node's level is deeper than the deepest-level-displayable variable. If so, the flow of control loops back to step 410 and the next node in structure definition file 190 is processed, until the last node is processed. For example, assuming no level 1 nodes are assigned an "open" state, script 180 will not waste time processing any nodes in the structure definition file that are hierarchically deeper than level 1. If the current node is potentially displayable, then step 430 tests whether the current node is open. This is done by checking if an exact match for the node's name is found within the PATH_INFO array. If so, the display state for that node is "open"; in that case, the node's level and name are added to a list of open nodes at step 440, and at step 450 the "deepest level" variable is increased (if needed) to match the level of that node plus one.

Next, whether the current node is itself open or closed, step 450 determines if the current node should be displayed or not. This decision is fairly straightforward. If the node's level equals 1, then the entry is displayed. If the level is not 1, then the node is displayed if and only if: the list of open nodes contains a node that is one level shallower than the current node's level, and the current node is a child of that open node. If the current node is not to be displayed, then flow of control returns to step 410 and the next node in the file is processed, until the last node is processed. However, if the current node is to be displayed, then step 460 adds an entry containing the current node's LABEL to the Web page that script 180 dynamically generates. At step 465, hypertextual information is determined for the current node. If the node is a leaf node and its entry in structure definition file 190 includes an explicit URL, then that URL is encoded as a hypertext link for that node's entry in the Web page. Otherwise, a URL is created including the path address for script 180, plus the current PATH_INFO, plus the name of the current node, and that URL is encoded as a hypertext link for that node's entry in the Web page.

For those nodes which are added to the Web page, appropriate indentation is preferably provided in order to visually represent the different levels of hierarchy in the TOC display. In our preferred embodiment, script program 180 generates web pages in which directory lists are used to indent the child nodes, allowing use of customized TOC icons as shown for example in FIGS. 1(A) through 1(E). More generally, specifying the display of child nodes using indented menu lists works equally well, if customized graphics are not desired. Practitioners of ordinary skill in the relevant arts will readily apply other display techniques and formats as well, depending on the needs and contexts of the particular applications being created. In any event, if some form of indentation is desired as a representation of TOC hierarchy, then script 180 preferably writes the level of any node that is displayed to a "current level" storage variable. Before adding a new entry to the Web page, script program 180 preferably compares the level of the entry to be added against the "current level"; an increase or decrease in level dictates inserting an appropriate indentation code into the Web page at that point. Also, an anchor is preferably added to the entry if the name of the current node matches the very last name in the PATH_INFO list, in order to maintain context for the user.

At this point, processing of the current node is complete, and the flow of control proceeds to decision point 470. If the node just processed is the last one in structure definition file 190, then the algorithm concludes (step 480), and dynamically created Web page 145 is ready for transmission to client 100. Otherwise, processing continues with the next node at step 410.

F. An Example

Consider as an example the TOC defined by the structure definition file provided above in an earlier section:

1|ST|"Starting Node"|

2|STCH|"First Child Node"|

3|STCHCH|"Next Generation Node"|http://foo.com

2|STCHI|"Second Child Node"|http://bar.com

Assume the network URL for script 180 is "niftnav.cgi". An end-user of client 100 would use browser 120 to access script 180, by transmitting the URL "niftnav.cgi" as an HTTP request to server 150. In response, script 180 would execute the algorithm of FIG. 4. Since PATH_INFO is empty, the algorithm of FIG. 4 would keep "deepest level" at 1, and only process the nodes with LEVEL=1. Here, only one node ("Starting Node") has a LEVEL of 1, so the dynamically generated Web page would contain only a single entry:

<a href="niftnav.cgi/ST"> Starting Node </a>

Note that the hypertext link is the original URL for script 180, with Starting Node's NAME ("ST") appended. Thus, if the end-user at client 100 should then interactively select "Starting Node" from the displayed page, an HTTP request containing the URL "niftnav.cgi/ST" would be transmitted by browser 120 to server 150. In response, script 180 would again execute the algorithm of FIG. 4, but this time the PATH_INFO value of "ST" would be interpreted and acted on so as to generate a new Web page in which "Starting Node" is opened:

<a href="niftnav.cgi/ST/ST"> Starting Node </a>

<dl>

<dd><a href="niftnav.cgi/ST/STCH"> First Child Node </a></dd>

<dd><a href="http://bar.com"> Second Child Node </a></dd>

</dl>

When displayed at client 100 on monitor 110, this new page would include "Starting Node" as before, along with children nodes "First Child Node" and "Second Child Node" nested below in an indented list. Each such entry is associated with a different hypertext link, as determined by the algorithm of FIG. 4. Thus, selecting "Starting Node" again would toggle that node's display state and close it. In particular, the URL "niftnav.cgi/ST/ST" would be transmitted to server 150, and the duplicate "ST" in PATH_INFO would ultimately cause script 180 to generate a new page in which Starting Node" and all of its children (everything in the list) were closed, giving the user a page exactly like the very first one discussed in this example. Selecting "Second Child Node" would transmit the URL "http://bar.com" over the network, and would take the user away from the TOC to the information residing at the specified Web destination. Selecting "First Child Node" would transmit an URL to server 150 with PATH_INFO="ST/STCH". This would lead script 180 to generate another new page, this time opening Starting Node as well as First Child Node, thus adding "Next Generation Node" as a new entry nested below "First Child Node", and modifying the linked URL for First Child node to reflect the toggling of its display state. HTML code for the new Web page would look like this:

<a href="niftnav.cgi/ST/ST"> Starting Node </a>

<dl>

<dd><a href="niftnav.cgi/ST/STCH/STCH"> First Child Node </a></dd>

<dl>

<dd><a href="http://foo.com"> Next Generation Node </a></dd>

</dl>

<dd><a href="http://bar.com"> Second Child Node </a></dd>

</dl>

G. Bookmarks

A further advantage of our preferred embodiment of the present invention is its compatibility with standard "bookmark" facilities. Standard HTML browsers typically permit users to request that an accessed Web site be earmarked for easy future access by saving a "bookmark" for that site, so that the user does not need to manually re-enter the URL. Because the preferred embodiment represents display state in the PATH_INFO portion of each URL, an end-user can use standard browser 120 to "bookmark" the TOC in any desired display state. If the user ever subsequently invokes that bookmark, the correct URL—automatically including the appropriate PATH_INFO data—will be transmitted, and the desired display state of the TOC will be perfectly restored.

H. Other Variations

Those skilled in the relevant arts will naturally develop many variations and modifications of the preferred embodiment that has been described. The scope of the present invention is limited only by the limitations of the following claims, and equivalents thereto.

We claim:

1. A method for providing an expandable, hierarchical table of contents ("TOC") to use with a computer network comprising at least one client computer coupled by a network link to at least one server computer, said method comprising :

providing to the server a predetermined digital specification of the TOC comprising a plurality of hierarchically related nodes;

receiving, by the server, an address path from the client;

dynamically generating by the server a network page specifying display of a selected hierarchical portion of the TOC nodes, without collapsing a previously selected hierarchical portion, the selected hierarchical portion being determined based on the path address and the digital specification; and transmitting the network page from the server to the client.

2. The method of claim 1, wherein the digital specification has a unique name, a display label, and a hierarchical level for each node of the TOC, and an optional hypertext link for each leaf node of the TOC.

3. The method of claim 1, wherein said dynamically generating a network page further includes assigning a different path address as a hypertextual link for at least one of the TOC nodes in the selected hierarchical portion, wherein the different path address specifies a modified display status for the TOC nodes that are hierarchical descendants of the at least one TOC node.

4. An apparatus for providing an expandable, hierarchical table of contents ("TOC") for use with a computer network comprising at least one client computer coupled by network link to at least one server computer, said apparatus comprising:

a predetermined digital specification of the TOC comprising a plurality of hierarchically related nodes, said digital specification coupled to the server;

first server means for receiving an address path from the client;

second server means for dynamically generating a network page specifying display of a selected hierarchical portion of the TOC nodes, without collapsing a previously selected hierarchical portion, said second server means determining the selected hierarchical portion based on the path address and said digital specification; and third server means for transmitting the network page to the client.

5. The apparatus of claim 4, wherein said digital specification has a unique name, a display label, and a hierarchical level for each node of the TOC, and an optional hypertext link for each leaf node of the TOC.

6. The apparatus of claim 4, wherein said second server means further includes means for assigning a different path address as a hypertextual link for at least one of the TOC nodes in the selected hierarchical portion, wherein the different path address specifies a modified display status for the TOC nodes that are hierarchical descendants of the at least one TOC node.

7. A method for providing an expandable, hierarchical table of contents ("TOC") for use with a computer network comprising at least one client computer coupled by network link to at least one server computer, said method comprising:

transmitting a network page from the server to the client, the network page specifying display of a hierarchical portion of the TOC, the TOC comprising a plurality of hierarchically related nodes;

displaying the hierarchical portion of the TOC by the client, as specified by the network page;

interactively selecting one of the displayed TOC nodes, by the client;

dynamically generating by the server a new network page specifying a modified display status for the TOC nodes that are hierarchical descendants of the selected node, without collapsing a previously selected hierarchical portion of the TOC; and transmitting the new network page from the server to the client.

8. A method for providing an expandable, hierarchical table of contents ("TOC") from a server computer to a client computer over a network, comprising:

providing to the server a predetermined digital specification of the TOC having a plurality of hierarchically-related nodes, and an address path from the client for a selected TOC node; and generating, by the server, a network page containing a collapsed portion of the TOC for the selected node if the selected node was previously expanded, and an expanded portion of the TOC for the selected node if the selected node was previously unexpanded, without collapsing another expanded node, the portions of the TOC generated being based upon the path address and the digital specification, and transmitting the network page from the server to the client for display.

9. An apparatus for providing an expandable, hierarchical table of contents ("TOC") for use with a computer network comprising at least one client computer coupled by network link to at least one server computer, said apparatus comprising:

a predetermined digital specification of the TOC comprising a plurality of hierarchically related nodes, said digital specification coupled to the server;

a first server unit receiving an address path from the client;

a second server unit dynamically generating a network page specifying display of a selected hierarchical portion of the TOC nodes, without collapsing a previously selected hierarchical portion, said second server unit determining the selected hierarchical portion based on the path address and said digital specification; and a third server unit transmitting the network page to the client.

10. An apparatus, comprising a system having a web interface displaying an expanded first node and allowing expansion of a second node without closing the first node.

11. A method, comprising displaying, via a web interface, an expanded first node and allowing expansion of a second node without closing the first node.

* * * * *

UNITED STATES PATENT AND TRADEMARK OFFICE
CERTIFICATE OF CORRECTION

PATENT NO. : 6,199,098 B1
DATED : March 6, 2001
INVENTOR(S) : Kirsten Lynn Jones, et al.

Page 1 of 1

It is certified that error appears in the above-identified patent and that said Letters Patent is hereby corrected as shown below:

Column 3,
Line 41, change "assignes" to -- assigns --.

Column 5,
Line 10, change "FIG. 1*c*" to -- FIG. 1c --.

Column 6,
Line 30, change "hierarchy" to -- hierarchical --.

Column 10,
Line 34, change "-" to -- -- --.
Line 35, change "-" to -- -- --.

Signed and Sealed this

Sixteenth Day of October, 2001

Attest:

NICHOLAS P. GODICI
Attesting Officer
Acting Director of the United States Patent and Trademark Office